US009349392B1

(12) United States Patent
Zeng et al.

(10) Patent No.: US 9,349,392 B1
(45) Date of Patent: May 24, 2016

(54) METHODS FOR IMPROVING ADHESION ON DIELECTRIC SUBSTRATES

(75) Inventors: Wanxue Zeng, Pleasanton, CA (US); Weimin Si, San Ramon, CA (US); Ying Hong, Los Gatos, CA (US); Lieping Zhong, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 194 days.

(21) Appl. No.: 13/480,278

(22) Filed: May 24, 2012

(51) Int. Cl.
*G11B 5/187* (2006.01)
*G11B 5/31* (2006.01)

(52) U.S. Cl.
CPC ............ *G11B 5/187* (2013.01); *G11B 5/3163* (2013.01)

(58) Field of Classification Search
None
See application file for complete search history.

(56) References Cited

U.S. PATENT DOCUMENTS

| | | | |
|---|---|---|---|
| 5,554,866 A * | 9/1996 | Nishioka et al. | 257/295 |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |
| 6,118,629 A | 9/2000 | Huai et al. | |
| 6,118,638 A | 9/2000 | Knapp et al. | |
| 6,125,018 A | 9/2000 | Takagishi et al. | |
| 6,130,779 A | 10/2000 | Carlson et al. | |
| 6,134,089 A | 10/2000 | Barr et al. | |
| 6,136,166 A | 10/2000 | Shen et al. | |
| 6,137,661 A | 10/2000 | Shi et al. | |
| 6,137,662 A | 10/2000 | Huai et al. | |
| 6,139,971 A * | 10/2000 | Bruchhaus et al. | 428/446 |
| 6,160,684 A | 12/2000 | Heist et al. | |
| 6,163,426 A | 12/2000 | Nepela et al. | |
| 6,166,891 A | 12/2000 | Lederman et al. | |
| 6,173,486 B1 | 1/2001 | Hsiao et al. | |
| 6,175,476 B1 | 1/2001 | Huai et al. | |

(Continued)

OTHER PUBLICATIONS

Wanxue Zeng, et al., U.S. Appl. No. 13/044,712, filed Dec. 10, 2011, 13 pages.

*Primary Examiner* — Kevin Bernatz

(57) ABSTRACT

Various embodiments described herein provide for substrate structures including uniform plating seed layers, and that provide favorable adhesion on dielectric substrate layers. According to some embodiments, a methods for forming a magnetic recording pole is provided comprising: forming an insulator layer; forming a trench in the insulator layer; forming an amorphous seed layer over the insulator layer; forming an adhesion layer over the amorphous seed layer, the adhesion layer comprising a physical vapor deposited (PVD) noble metal; forming a plating seed layer over the adhesion layer, the plating seed layer comprising chemical vapor deposited (CVD) Ru; and forming a magnetic material layer over the plating seed layer.

4 Claims, 5 Drawing Sheets

(56) References Cited

U.S. PATENT DOCUMENTS

| | | | |
|---|---|---|---|
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,249,082 B1 * | 6/2001 | Fukuyoshi et al. ........... 313/479 |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |

(56) References Cited

U.S. PATENT DOCUMENTS

| | | | |
|---|---|---|---|
| 6,729,015 B2 | 5/2004 | Matono et al. | |
| 6,735,850 B1 | 5/2004 | Gibbons et al. | |
| 6,737,281 B1 | 5/2004 | Dang et al. | |
| 6,737,692 B2 * | 5/2004 | Gabric et al. | 257/295 |
| 6,744,608 B1 | 6/2004 | Sin et al. | |
| 6,747,301 B1 | 6/2004 | Hiner et al. | |
| 6,751,055 B1 | 6/2004 | Alfoqaha et al. | |
| 6,754,049 B1 | 6/2004 | Seagle et al. | |
| 6,756,071 B1 | 6/2004 | Shi et al. | |
| 6,757,140 B1 | 6/2004 | Hawwa | |
| 6,760,196 B1 | 7/2004 | Niu et al. | |
| 6,762,910 B1 | 7/2004 | Knapp et al. | |
| 6,765,756 B1 | 7/2004 | Hong et al. | |
| 6,775,902 B1 | 8/2004 | Huai et al. | |
| 6,778,358 B1 | 8/2004 | Jiang et al. | |
| 6,781,927 B1 | 8/2004 | Heanuc et al. | |
| 6,785,955 B1 | 9/2004 | Chen et al. | |
| 6,791,793 B1 | 9/2004 | Chen et al. | |
| 6,791,807 B1 | 9/2004 | Hikami et al. | |
| 6,798,616 B1 | 9/2004 | Seagle et al. | |
| 6,798,625 B1 | 9/2004 | Ueno et al. | |
| 6,801,408 B1 | 10/2004 | Chen et al. | |
| 6,801,411 B1 | 10/2004 | Lederman et al. | |
| 6,803,615 B1 | 10/2004 | Sin et al. | |
| 6,806,035 B1 | 10/2004 | Atireklapvarodom et al. | |
| 6,807,030 B1 | 10/2004 | Hawwa et al. | |
| 6,807,332 B1 | 10/2004 | Hawwa | |
| 6,809,899 B1 | 10/2004 | Chen et al. | |
| 6,816,345 B1 | 11/2004 | Knapp et al. | |
| 6,828,897 B1 | 12/2004 | Nepela | |
| 6,829,160 B1 | 12/2004 | Qi et al. | |
| 6,829,819 B1 | 12/2004 | Crue, Jr. et al. | |
| 6,833,979 B1 | 12/2004 | Knapp et al. | |
| 6,834,010 B1 | 12/2004 | Qi et al. | |
| 6,859,343 B1 | 2/2005 | Alfoqaha et al. | |
| 6,859,997 B1 | 3/2005 | Tong et al. | |
| 6,861,937 B1 | 3/2005 | Feng et al. | |
| 6,870,712 B2 | 3/2005 | Chen et al. | |
| 6,873,494 B2 | 3/2005 | Chen et al. | |
| 6,873,547 B1 | 3/2005 | Shi et al. | |
| 6,879,464 B2 | 4/2005 | Sun et al. | |
| 6,888,184 B1 | 5/2005 | Shi et al. | |
| 6,888,704 B1 | 5/2005 | Diao et al. | |
| 6,891,702 B1 | 5/2005 | Tang | |
| 6,894,871 B2 | 5/2005 | Alfoqaha et al. | |
| 6,894,877 B1 | 5/2005 | Crue, Jr. et al. | |
| 6,906,894 B2 | 6/2005 | Chen et al. | |
| 6,909,578 B1 | 6/2005 | Missell et al. | |
| 6,912,106 B1 | 6/2005 | Chen et al. | |
| 6,934,113 B1 | 8/2005 | Chen | |
| 6,934,129 B1 | 8/2005 | Zhang et al. | |
| 6,940,688 B2 | 9/2005 | Jiang et al. | |
| 6,942,824 B1 | 9/2005 | Li | |
| 6,943,993 B2 | 9/2005 | Chang et al. | |
| 6,944,938 B1 | 9/2005 | Crue, Jr. et al. | |
| 6,947,258 B1 | 9/2005 | Li | |
| 6,950,266 B1 | 9/2005 | McCaslin et al. | |
| 6,954,332 B1 | 10/2005 | Hong et al. | |
| 6,958,885 B1 | 10/2005 | Chen et al. | |
| 6,961,221 B1 | 11/2005 | Niu et al. | |
| 6,969,989 B1 | 11/2005 | Mei | |
| 6,975,486 B2 | 12/2005 | Chen et al. | |
| 6,987,643 B1 | 1/2006 | Seagle | |
| 6,989,962 B1 | 1/2006 | Dong et al. | |
| 6,989,972 B1 | 1/2006 | Stoev et al. | |
| 7,006,327 B2 | 2/2006 | Krounbi et al. | |
| 7,007,372 B1 | 3/2006 | Chen et al. | |
| 7,012,832 B1 | 3/2006 | Sin et al. | |
| 7,023,658 B1 | 4/2006 | Knapp et al. | |
| 7,026,063 B2 | 4/2006 | Ueno et al. | |
| 7,027,268 B1 | 4/2006 | Zhu et al. | |
| 7,027,274 B1 | 4/2006 | Sin et al. | |
| 7,035,046 B1 | 4/2006 | Young et al. | |
| 7,041,985 B1 | 5/2006 | Wang et al. | |
| 7,046,490 B1 | 5/2006 | Ueno et al. | |
| 7,054,113 B1 | 5/2006 | Seagle et al. | |
| 7,057,857 B1 | 6/2006 | Niu et al. | |
| 7,059,868 B1 | 6/2006 | Yan | |
| 7,092,195 B1 | 8/2006 | Liu et al. | |
| 7,110,289 B1 | 9/2006 | Sin et al. | |
| 7,111,382 B1 | 9/2006 | Knapp et al. | |
| 7,113,366 B1 | 9/2006 | Wang et al. | |
| 7,114,241 B2 | 10/2006 | Kubota et al. | |
| 7,116,517 B1 | 10/2006 | He et al. | |
| 7,124,654 B1 | 10/2006 | Davies et al. | |
| 7,126,788 B1 | 10/2006 | Liu et al. | |
| 7,126,790 B1 | 10/2006 | Liu et al. | |
| 7,131,346 B1 | 11/2006 | Buttar et al. | |
| 7,133,253 B1 | 11/2006 | Seagle et al. | |
| 7,134,185 B1 | 11/2006 | Knapp et al. | |
| 7,154,715 B2 | 12/2006 | Yamanaka et al. | |
| 7,170,725 B1 | 1/2007 | Zhou et al. | |
| 7,177,117 B1 | 2/2007 | Jiang et al. | |
| 7,193,815 B1 | 3/2007 | Stoev et al. | |
| 7,196,880 B1 | 3/2007 | Anderson et al. | |
| 7,199,974 B1 | 4/2007 | Alfoqaha | |
| 7,199,975 B1 | 4/2007 | Pan | |
| 7,211,339 B1 | 5/2007 | Seagle et al. | |
| 7,212,384 B1 | 5/2007 | Stoev et al. | |
| 7,238,292 B1 | 7/2007 | He et al. | |
| 7,239,478 B1 | 7/2007 | Sin et al. | |
| 7,244,519 B2 | 7/2007 | Festeau | |
| 7,248,431 B1 | 7/2007 | Liu et al. | |
| 7,248,433 B1 | 7/2007 | Stoev et al. | |
| 7,248,449 B1 | 7/2007 | Seagle | |
| 7,280,325 B1 | 10/2007 | Pan | |
| 7,283,327 B1 | 10/2007 | Liu et al. | |
| 7,284,316 B1 | 10/2007 | Huai et al. | |
| 7,286,329 B1 | 10/2007 | Chen et al. | |
| 7,289,303 B1 | 10/2007 | Sin et al. | |
| 7,292,409 B1 | 11/2007 | Stoev et al. | |
| 7,296,339 B1 | 11/2007 | Yang et al. | |
| 7,307,814 B1 | 12/2007 | Seagle et al. | |
| 7,307,818 B1 | 12/2007 | Park et al. | |
| 7,310,204 B1 | 12/2007 | Stoev et al. | |
| 7,318,947 B1 | 1/2008 | Park et al. | |
| 7,333,295 B1 | 2/2008 | Medina et al. | |
| 7,337,530 B1 | 3/2008 | Stoev et al. | |
| 7,342,752 B1 | 3/2008 | Zhang et al. | |
| 7,349,170 B1 | 3/2008 | Rudman et al. | |
| 7,349,179 B1 | 3/2008 | He et al. | |
| 7,354,664 B1 | 4/2008 | Jiang et al. | |
| 7,363,697 B1 | 4/2008 | Dunn et al. | |
| 7,371,152 B1 | 5/2008 | Newman | |
| 7,372,665 B1 | 5/2008 | Stoev et al. | |
| 7,375,926 B1 | 5/2008 | Stoev et al. | |
| 7,379,269 B1 | 5/2008 | Krounbi et al. | |
| 7,386,933 B1 | 6/2008 | Krounbi et al. | |
| 7,389,577 B1 | 6/2008 | Shang et al. | |
| 7,417,832 B1 | 8/2008 | Erickson et al. | |
| 7,419,891 B1 | 9/2008 | Chen et al. | |
| 7,428,124 B1 | 9/2008 | Song et al. | |
| 7,430,098 B1 | 9/2008 | Song et al. | |
| 7,436,620 B1 | 10/2008 | Kang et al. | |
| 7,436,638 B1 | 10/2008 | Pan | |
| 7,438,949 B2 | 10/2008 | Weidman | |
| 7,440,220 B1 | 10/2008 | Kang et al. | |
| 7,443,632 B1 | 10/2008 | Stoev et al. | |
| 7,444,740 B1 | 11/2008 | Chung et al. | |
| 7,446,032 B2 | 11/2008 | Kailasam | |
| 7,493,688 B1 | 2/2009 | Wang et al. | |
| 7,508,627 B1 | 3/2009 | Zhang et al. | |
| 7,522,377 B1 | 4/2009 | Jiang et al. | |
| 7,522,379 B1 | 4/2009 | Krounbi et al. | |
| 7,522,382 B1 | 4/2009 | Pan | |
| 7,542,246 B1 | 6/2009 | Song et al. | |
| 7,547,933 B2 * | 6/2009 | Takamatsu et al. | 257/295 |
| 7,551,406 B1 | 6/2009 | Thomas et al. | |
| 7,552,523 B1 | 6/2009 | He et al. | |
| 7,554,767 B1 | 6/2009 | Hu et al. | |
| 7,566,661 B2 | 7/2009 | Lavoie | |
| 7,583,466 B2 | 9/2009 | Kermiche et al. | |
| 7,595,967 B1 | 9/2009 | Moon et al. | |
| 7,639,457 B1 | 12/2009 | Chen et al. | |

(56) References Cited

U.S. PATENT DOCUMENTS

| | | | |
|---|---|---|---|
| 7,651,934 | B2 | 1/2010 | Lubomirsky |
| 7,660,080 | B1 | 2/2010 | Liu et al. |
| 7,672,080 | B1 | 3/2010 | Tang et al. |
| 7,672,086 | B1 | 3/2010 | Jiang |
| 7,684,160 | B1 | 3/2010 | Erickson et al. |
| 7,688,546 | B1 | 3/2010 | Bai et al. |
| 7,691,434 | B1 | 4/2010 | Zhang et al. |
| 7,691,442 | B2 | 4/2010 | Gandikota |
| 7,695,761 | B1 | 4/2010 | Shen et al. |
| 7,719,795 | B2 | 5/2010 | Hu et al. |
| 7,726,009 | B1 | 6/2010 | Liu et al. |
| 7,729,086 | B1 | 6/2010 | Song et al. |
| 7,729,087 | B1 | 6/2010 | Stoev et al. |
| 7,736,823 | B1 | 6/2010 | Wang et al. |
| 7,785,658 | B2 | 8/2010 | Shinriki |
| 7,785,666 | B1 | 8/2010 | Sun et al. |
| 7,796,356 | B1 | 9/2010 | Fowler et al. |
| 7,800,858 | B1 | 9/2010 | Bajikar et al. |
| 7,819,979 | B1 | 10/2010 | Chen et al. |
| 7,829,264 | B1 | 11/2010 | Wang et al. |
| 7,846,643 | B1 | 12/2010 | Sun et al. |
| 7,851,360 | B2 | 12/2010 | Dominguez |
| 7,855,854 | B2 | 12/2010 | Hu et al. |
| 7,859,792 | B2 * | 12/2010 | Miyata et al. ............ 360/125.12 |
| 7,869,160 | B1 | 1/2011 | Pan et al. |
| 7,872,824 | B1 | 1/2011 | Macchioni et al. |
| 7,872,833 | B2 | 1/2011 | Hu et al. |
| 7,910,267 | B1 | 3/2011 | Zeng et al. |
| 7,911,735 | B1 | 3/2011 | Sin et al. |
| 7,911,737 | B1 * | 3/2011 | Jiang et al. ............... 360/125.12 |
| 7,916,426 | B2 | 3/2011 | Hu et al. |
| 7,918,013 | B1 | 4/2011 | Dunn et al. |
| 7,968,219 | B1 | 6/2011 | Jiang et al. |
| 7,982,989 | B1 | 7/2011 | Shi et al. |
| 8,008,912 | B1 | 8/2011 | Shang |
| 8,012,804 | B1 | 9/2011 | Wang et al. |
| 8,015,692 | B1 | 9/2011 | Zhang et al. |
| 8,018,677 | B1 | 9/2011 | Chung et al. |
| 8,018,678 | B1 | 9/2011 | Zhang et al. |
| 8,024,748 | B1 | 9/2011 | Moravec et al. |
| 8,072,705 | B1 | 12/2011 | Wang et al. |
| 8,074,345 | B1 | 12/2011 | Anguelouch et al. |
| 8,077,418 | B1 | 12/2011 | Hu et al. |
| 8,077,434 | B1 | 12/2011 | Shen et al. |
| 8,077,435 | B1 | 12/2011 | Liu et al. |
| 8,077,557 | B1 | 12/2011 | Hu et al. |
| 8,079,135 | B1 | 12/2011 | Shen et al. |
| 8,081,403 | B1 | 12/2011 | Chen et al. |
| 8,091,210 | B1 | 1/2012 | Sasaki et al. |
| 8,097,846 | B1 | 1/2012 | Anguelouch et al. |
| 8,104,166 | B1 | 1/2012 | Zhang et al. |
| 8,116,043 | B2 | 2/2012 | Leng et al. |
| 8,116,171 | B1 | 2/2012 | Lee |
| 8,125,856 | B1 | 2/2012 | Li et al. |
| 8,134,794 | B1 | 3/2012 | Wang |
| 8,136,224 | B1 | 3/2012 | Sun et al. |
| 8,136,225 | B1 | 3/2012 | Zhang et al. |
| 8,136,805 | B1 | 3/2012 | Lee |
| 8,141,235 | B1 | 3/2012 | Zhang |
| 8,146,236 | B1 | 4/2012 | Luo et al. |
| 8,149,536 | B1 | 4/2012 | Yang et al. |
| 8,151,441 | B1 | 4/2012 | Rudy et al. |
| 8,163,185 | B1 | 4/2012 | Sun et al. |
| 8,164,760 | B2 | 4/2012 | Willis |
| 8,164,855 | B1 | 4/2012 | Gibbons et al. |
| 8,164,864 | B2 | 4/2012 | Kaiser et al. |
| 8,165,709 | B1 | 4/2012 | Rudy |
| 8,166,631 | B1 | 5/2012 | Tran et al. |
| 8,166,632 | B1 | 5/2012 | Zhang et al. |
| 8,169,473 | B1 | 5/2012 | Yu et al. |
| 8,171,618 | B1 | 5/2012 | Wang et al. |
| 8,179,636 | B1 | 5/2012 | Bai et al. |
| 8,191,237 | B1 | 6/2012 | Luo et al. |
| 8,194,365 | B1 | 6/2012 | Leng et al. |
| 8,194,366 | B1 | 6/2012 | Li et al. |
| 8,196,285 | B1 | 6/2012 | Zhang et al. |
| 8,200,054 | B1 | 6/2012 | Li et al. |
| 8,203,800 | B2 | 6/2012 | Li et al. |
| 8,208,350 | B1 | 6/2012 | Hu et al. |
| 8,220,140 | B1 | 7/2012 | Wang et al. |
| 8,222,599 | B1 | 7/2012 | Chien |
| 8,225,488 | B1 | 7/2012 | Zhang et al. |
| 8,227,023 | B1 | 7/2012 | Liu et al. |
| 8,228,633 | B1 | 7/2012 | Tran et al. |
| 8,231,796 | B1 | 7/2012 | Li et al. |
| 8,233,248 | B1 | 7/2012 | Li et al. |
| 8,248,896 | B1 | 8/2012 | Yuan et al. |
| 8,254,060 | B1 | 8/2012 | Shi et al. |
| 8,257,597 | B1 | 9/2012 | Guan et al. |
| 8,259,410 | B1 | 9/2012 | Bai et al. |
| 8,259,539 | B1 | 9/2012 | Hu et al. |
| 8,262,918 | B1 | 9/2012 | Li et al. |
| 8,262,919 | B1 | 9/2012 | Luo et al. |
| 8,264,797 | B2 | 9/2012 | Emley |
| 8,264,798 | B1 | 9/2012 | Guan et al. |
| 8,270,126 | B1 | 9/2012 | Roy et al. |
| 8,276,258 | B1 | 10/2012 | Tran et al. |
| 8,277,669 | B1 | 10/2012 | Chen et al. |
| 8,279,719 | B1 | 10/2012 | Hu et al. |
| 8,284,517 | B1 | 10/2012 | Sun et al. |
| 8,288,204 | B1 | 10/2012 | Wang et al. |
| 8,289,821 | B1 | 10/2012 | Huber |
| 8,291,743 | B1 | 10/2012 | Shi et al. |
| 8,307,539 | B1 | 11/2012 | Rudy et al. |
| 8,307,540 | B1 | 11/2012 | Tran et al. |
| 8,308,921 | B1 | 11/2012 | Hiner et al. |
| 8,310,785 | B1 | 11/2012 | Zhang et al. |
| 8,310,901 | B1 | 11/2012 | Batra et al. |
| 8,315,019 | B1 | 11/2012 | Mao et al. |
| 8,316,527 | B2 | 11/2012 | Hong et al. |
| 8,320,076 | B1 | 11/2012 | Shen et al. |
| 8,320,077 | B1 | 11/2012 | Tang et al. |
| 8,320,219 | B1 | 11/2012 | Wolf et al. |
| 8,320,220 | B1 | 11/2012 | Yuan et al. |
| 8,320,722 | B1 | 11/2012 | Yuan et al. |
| 8,322,022 | B1 | 12/2012 | Yi et al. |
| 8,322,023 | B1 | 12/2012 | Zeng et al. |
| 8,325,569 | B1 | 12/2012 | Shi et al. |
| 8,333,008 | B1 | 12/2012 | Sin et al. |
| 8,334,093 | B2 | 12/2012 | Zhang et al. |
| 8,336,194 | B2 | 12/2012 | Yuan et al. |
| 8,339,738 | B1 | 12/2012 | Tran et al. |
| 8,341,826 | B1 | 1/2013 | Jiang et al. |
| 8,343,319 | B1 | 1/2013 | Li et al. |
| 8,343,364 | B1 | 1/2013 | Gao et al. |
| 8,349,195 | B1 | 1/2013 | Si et al. |
| 8,351,307 | B1 | 1/2013 | Wolf et al. |
| 8,357,244 | B1 | 1/2013 | Zhao et al. |
| 8,373,945 | B1 | 2/2013 | Luo et al. |
| 8,375,564 | B1 | 2/2013 | Luo et al. |
| 8,375,565 | B2 | 2/2013 | Hu et al. |
| 8,381,391 | B2 | 2/2013 | Park et al. |
| 8,385,157 | B1 | 2/2013 | Champion et al. |
| 8,385,158 | B1 | 2/2013 | Hu et al. |
| 8,394,280 | B1 | 3/2013 | Wan et al. |
| 8,400,731 | B1 | 3/2013 | Li et al. |
| 8,404,128 | B1 | 3/2013 | Zhang et al. |
| 8,404,129 | B1 | 3/2013 | Luo et al. |
| 8,405,930 | B1 | 3/2013 | Li et al. |
| 8,409,453 | B1 | 4/2013 | Jiang et al. |
| 8,413,317 | B1 | 4/2013 | Wan et al. |
| 8,416,540 | B1 | 4/2013 | Li et al. |
| 8,419,953 | B1 | 4/2013 | Su et al. |
| 8,419,954 | B1 | 4/2013 | Chen et al. |
| 8,422,176 | B1 | 4/2013 | Leng et al. |
| 8,422,342 | B1 | 4/2013 | Lee |
| 8,422,841 | B1 | 4/2013 | Shi et al. |
| 8,424,192 | B1 | 4/2013 | Yang et al. |
| 8,441,756 | B1 | 5/2013 | Sun et al. |
| 8,443,510 | B1 | 5/2013 | Shi et al. |
| 8,444,866 | B1 | 5/2013 | Guan et al. |
| 8,449,948 | B2 | 5/2013 | Medina et al. |
| 8,451,556 | B1 | 5/2013 | Wang et al. |
| 8,451,563 | B1 | 5/2013 | Zhang et al. |

(56) References Cited

U.S. PATENT DOCUMENTS

| | | | |
|---|---|---|---|
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 * | 4/2014 | Zeng ............... G11B 5/1278 360/125.03 |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,804 B2 * | 6/2014 | Brinkman et al. ...... 360/123.02 |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,988,824 B1 * | 3/2015 | Brinkman et al. ........ 360/125.3 |
| 2007/0059502 A1 * | 3/2007 | Wang et al. .................. 428/209 |
| 2007/0077750 A1 | 4/2007 | Ma |
| 2007/0096124 A1 * | 5/2007 | Shin et al. ...................... 257/88 |
| 2009/0128952 A1 * | 5/2009 | Sato et al. ................ 360/125.02 |
| 2009/0246715 A1 * | 10/2009 | Kouchi ................ C25D 5/022 430/324 |
| 2010/0119874 A1 * | 5/2010 | Zhang et al. ................. 428/812 |
| 2010/0290157 A1 | 11/2010 | Zhang et al. |
| 2011/0011744 A1 * | 1/2011 | Chen et al. ....................... 205/85 |
| 2011/0027977 A1 * | 2/2011 | Li ...................... C23C 16/0281 438/584 |
| 2011/0086240 A1 | 4/2011 | Xiang et al. |
| 2011/0094888 A1 * | 4/2011 | Chen et al. ....................... 205/81 |
| 2011/0147343 A1 * | 6/2011 | Araki et al. ...................... 216/22 |
| 2012/0111826 A1 | 5/2012 | Chen et al. |
| 2012/0127612 A1 * | 5/2012 | Shin et al. ................ 360/123.12 |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0229728 A1 * | 9/2013 | Brinkman et al. ............... 360/75 |
| 2013/0257421 A1 | 10/2013 | Shang et al. |
| 2014/0154529 A1 | 6/2014 | Yang et al. |
| 2014/0175050 A1 | 6/2014 | Zhang et al. |

* cited by examiner

US 9,349,392 B1

METHODS FOR IMPROVING ADHESION ON DIELECTRIC SUBSTRATES

TECHNICAL FIELD

This invention relates to dielectric substrates and, more particularly, improving adhesion on dielectric substrates, such as those used in magnetic recording poles for storage devices.

BACKGROUND

When fabricating Perpendicular Magnetic Recording (PMR) writer main poles (hereafter referred to simple as "PMR poles"), generally a trapezoidal shaped trench is etched into a thick substrate layer (e.g., alumina) and the trench is then filled with a magnetic material by way of a plating process. It has been shown that during fabrication, lining the inside of the trench and cover the top surface of the thick substrate layer with a plating seed layer can achieve a substantially void-free fill of the trench (with the magnetic material) while retaining desirable properties (e.g., as high saturation magnetization, low easy/hard axis coercivity, low anisotropy, high frequency response, and low remnant magnetization).

Using ruthenium (Ru) when plating high moment magnetic materials, such as those used in PMR poles, is known to provide the high moment magnetic materials with desirable properties for effective functioning of the magnetic head. Additionally, it can be useful and desirable to encapsulate the PMR pole with a soft magnetic shield, where the soft magnetic shield is plated over the top and sides of the PMR pole with an intervening non-magnetic spacer layer that also serves as a plating seed. Like with high momentum magnetic materials, Ru is well suited for the plating of soft high moment magnetic materials. Of known deposition techniques, Chemical Vapor Deposition (CVD) is one commercially viable method for providing conformal Ru deposition, and is often used for electroplating seed layers during PMR pole fabrication.

Unfortunately, it is a challenge to form a smooth, highly conformal layer of Ru on the inside of the trench or the exposed surfaces of the three dimensional PMR pole structure while also providing good thickness control and uniformity over the entire PMR pole structure. Additionally, employing a Chemical Vapor Deposition (CVD) Ru-based film as a Ru layer is known to cause peeling/delamination issues during plating processes or chemical mechanical polishing (CMP). This is especially true where the CVD Ru-based film is deposited from $RuO_4$-containing precursor and where the CVD-Ru-based film is deposited on a dielectric, such as an amorphous seed layer.

BRIEF DESCRIPTION OF THE DRAWINGS

The present invention is illustrated by way of example, and not limitation, in the figures of the accompanying drawings in which.

DETAILED DESCRIPTION

Figure 1A:
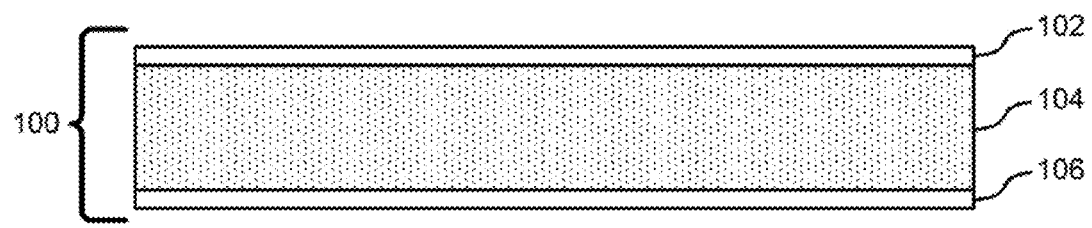
FIGS. 1A-1G are diagrams illustrating cross-sectional views of an exemplary substrate structure during a process for forming a substrate structure in accordance with some embodiments.

In the following description, numerous specific details are set forth, such as examples of specific layer compositions and properties, to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Various embodiments described herein provide for substrate structures including uniform plating seed layers, and that provide favorable adhesion over dielectric substrate layers. According to some embodiments, methods for forming such substrate structures are provided, where the methods comprising: forming an amorphous seed layer; forming an adhesion layer over the amorphous seed layer, the adhesion layer comprising a physical vapor deposited (PVD) noble metal; and forming a plating seed layer over the adhesion layer, the plating seed layer comprising chemical vapor deposited (CVD) Ru. According to some embodiments, substrate structures are provided, where the products comprises: an amorphous seed layer disposed over the insulator; an adhesion layer disposed over the amorphous seed layer, the adhesion layer comprising a physical vapor deposited (PVD) noble metal; and a plating seed layer disposed over the adhesion layer, the plating seed layer comprising chemical vapor deposited (CVD) Ru.

By inserting a physical vapor deposited (PVD) Ru-film adhesion layer between a CVD Ru-layer and an amorphous seed layer, various embodiments can achieve favorable adhesion between the CVD Ru-layer and the amorphous seed layer (i.e., reduce the chances of CVD Ru delamination) and excellent film properties on amorphous the seed layers. Use of various embodiments may also result in the CVD Ru layer exhibiting a smooth surface and excellent step coverage. For some embodiments, the physical vapor deposited (PVD) Ru-film adhesion layer can improve adhesion between a CVD RU layer and a dielectric material typically used in amorphous seed layer.

Usually, when a CVD Ru-layer is deposited on substrate materials typically used in a Perpendicular Magnetic Recording (PMR) read/write head, the CVD-Ru-layer often exhibits different deposition rates, extremely rough surface, and significantly poor within wafer (wiw) uniformity, which all can have negative impact on the PMR read/write head's yield and performance. For some embodiments, such issues can be addressed by forming a thin amorphous seed layer underneath the CVD Ru-based layer to block the substrate materials' impact on the CVD Ru growth mechanism. Depending on the embodiment, the amorphous seed layer may comprise a dielectric material, such as $TaO_x$, $TiO_x$, $AlO_x$, $SiO_x$, or $WO_x$. In order to promote adhesion between the CVD Ru-based layer and the dielectric material and prevent extensive delamination by the CVD Ru-based layer, an adhesion layer comprising a physical vapor deposited (PVD) noble metal may be inserted between the CVD Ru-layer and the dielectric material layer.

For some embodiments, the substrate structure may be utilized in a magnetic recording pole for a storage device, such as a Perpendicular Magnetic Recording (PMR) writer main pole. As such, some embodiments provide for a method for forming a magnetic recording pole comprising: forming an insulator layer; forming a trench in the insulator layer; forming an amorphous seed layer over the insulator layer; forming an adhesion layer over the amorphous seed layer, the adhesion layer comprising a physical vapor deposited (PVD) noble metal; forming a plating seed layer over the adhesion layer, the plating seed layer comprising chemical vapor deposited (CVD) Ru; and forming a magnetic material layer over the plating seed layer. Additionally, some embodiments provide for a magnetic recording pole in accordance with some embodiments may comprise: an insulator layer; an amorphous seed layer disposed over the insulator; an adhesion layer disposed over the amorphous seed layer, the adhesion layer comprising a physical vapor deposited (PVD) noble metal; a plating seed layer disposed over the adhesion layer, the plating seed layer comprising chemical vapor deposited (CVD) Ru; and a magnetic material layer disposed over the plating seed layer.

FIGS. 1A-1G are diagrams illustrating cross-sectional views of an exemplary substrate structure 100 during a process for forming a substrate structure in accordance with some embodiments. Depending on the embodiments, the substrate structure 100 eventually formed may be for a Perpendicular Magnetic Recording (PMR) read/write head and, more specifically, a PMR writer pole. In accordance with some embodiments, the process for forming the substrate structure 100 may include deposition of an amorphous seed layer for providing a substantially uniform and conformal Ru plating seed layer, and deposition of an adhesion layer over the amorphous seed layer to promote adhesion between the amorphous seed layer and one or more layers deposited over the adhesion layer (e.g., a plating seed layer).

FIG. 1A is a cross-sectional view of the substrate structure 100 including a mask layer 102 over an insulator substrate 104 disposed over a lower substrate or base layer 106 in accordance with some embodiments. The mask layer 102 may comprise tantalum (Ta) or another suitable material, the insulator substrate 104 may comprise alumina or another suitable material, and the lower substrate 102 may comprise chromium (Cr) or another suitable layer. In certain embodiments, the Cr-base layer is an etching stop layer for subsequent etching of the insulator substrate 104.

Figure 1B:
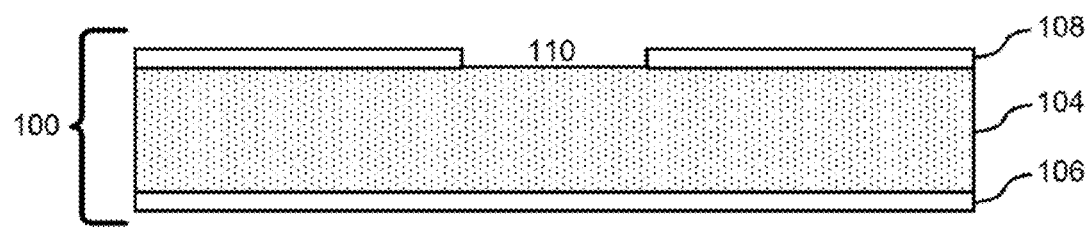
Figure 1C:
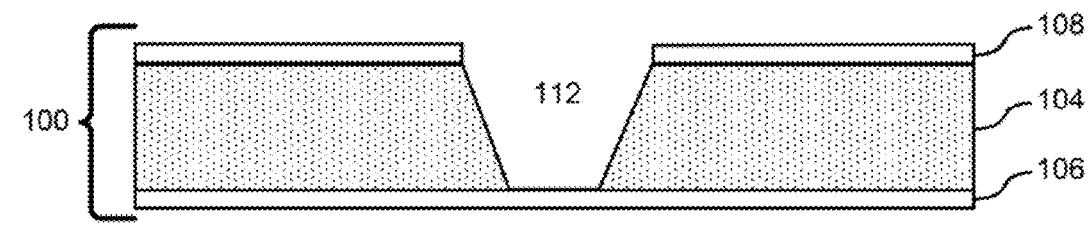

In FIG. 1B, the mask layer 102 may be patterned to form a patterned mask 108, having an opening 110 over a region of insulator substrate 104 where a damascene trench is intended to be formed. FIG. 1C provides a cross-sectional view of the substrate structure 100 after an etching process has removed a portion of the insulator substrate to form a trench 112 in accordance with some embodiments. For particular embodiments, the etching process is a reactive ion etching process, which can produce damascene trench.

Figure 1D:
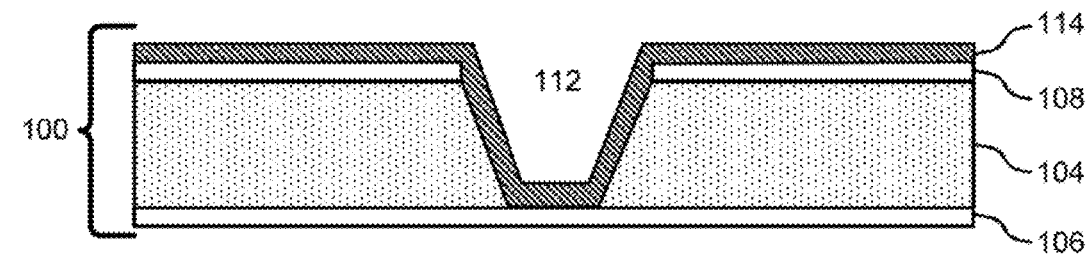

FIG. 1D provides a cross-sectional view of the substrate structure 100 after an amorphous seed layer 114 including a metal oxide, metal nitride or metal alloy has been deposited over the substrate structure 100 in accordance with some embodiments. According to some embodiments, the amorphous seed layer 114 may include any of the valve metals, such as Al, Ti, Tu, Ta, W, Ta, Hf, Nb, Zr or Si. Additionally, for some embodiments, the amorphous seed layer 114 may comprise $TaO_x$, $TiO_x$, $AlO_x$, $SiO_x$, or $WO_x$.

The amorphous seed layer 114 may be deposited using a physical vapor deposition (PVD), a chemical vapor deposition (CVD), or an atomic layer deposition (ALD) process. In various embodiments, the amorphous seed layer 114 may be deposited as a metal film and then permitted to oxidize by ambient air or by an accelerant. In some embodiments, the accelerant may be a material including $RuO_4$. In particular embodiments, the amorphous seed layer 114 may be deposited as a metal film and then allowed to oxidize by a combination of ambient air and $RuO_4$.

In certain embodiments, where the amorphous seed layer 114 includes Ta, a chemical vapor deposition (CVD) Ru plating seed layer over the amorphous seed layer 114 can provide substantially more uniform and conformal CVD Ru plating seed layer than the same CVD Ru plating layer over a Ta/Ru seed layer.

Depending on the embodiment, an additional control layer may be disposed over the substrate structure 100 prior to depositing the amorphous seed layer 114 to form a narrower trench. The control layer may be added to help control the final shape and track width of the substrate structure 100 when used in a Perpendicular Magnetic Recording (PMR) writer pole. The control layer can include one or more layers of alumina deposited via atomic layer deposition (ALD). Control layer may include layers of other suitable materials deposited by suitable deposition methods.

In accordance with some embodiments, a surface treatment material may be disposed over the substrate structure 100 prior to depositing the amorphous seed layer 114, thereby reducing delamination effects during the deposition process. According to some embodiments, the surface treatment material may be an etching material that can be deposited using deposition processes known in the art.

Figure 1E:
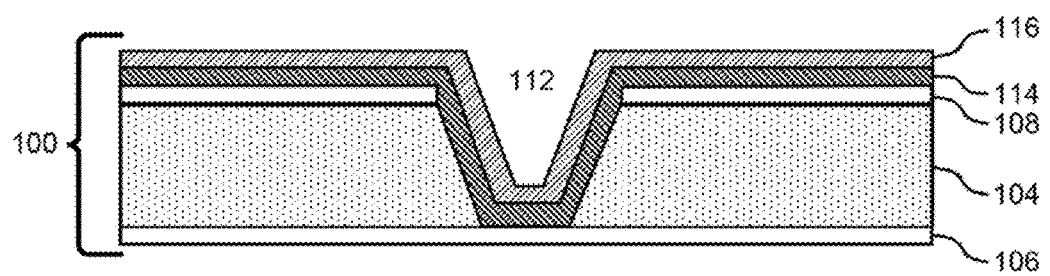

FIG. 1E provides a cross-sectional view of the substrate structure 100 after an adhesion layer 116 including a noble metal has been deposited over the substrate structure 100 in accordance with some embodiments. According to one embodiment, the adhesion layer 116 may include such noble metals as comprises Ru, Rh, Pd, Ag, Os, Ir, Pt, or Au. The adhesion layer 116 may be deposited using a physical vapor deposition (PVD). By inserting a physical vapor deposited (PVD) noble metal adhesion layer, such as a PVD Ru-film adhesion layer, between a CVD Ru-layer and an amorphous seed layer, various embodiments can achieve favorable adhesion between the CVD Ru-layer and the amorphous seed layer (i.e., reduce the chances of CVD Ru delamination) and excellent film properties on amorphous the seed layers.

Figure 1F:
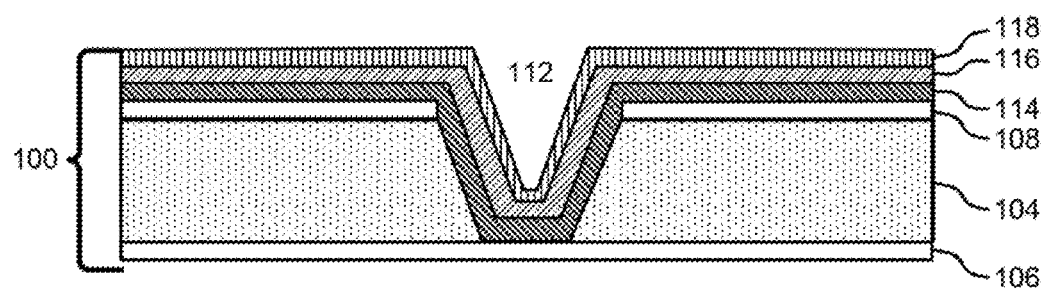

FIG. 1F provides a cross-sectional view of the substrate structure 100 after a plating seed layer 118 including Ru has been deposited over the adhesion layer 116 in accordance with some embodiments. In some embodiments, the plating seed layer 118 may be deposited using a chemical vapor deposition (CVD) process. In various embodiments, other suitable deposition techniques, such as atomic layer deposition (ALD), can be used to deposit the plating seed layer 118 over the adhesion layer 116.

Figure 1G:
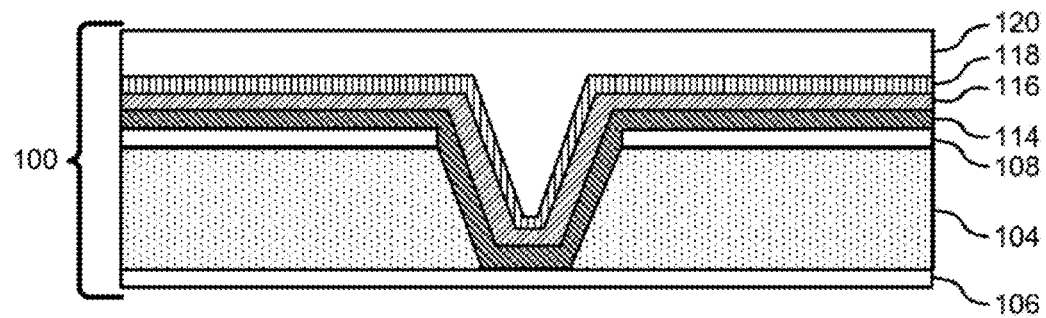

FIG. 1G provides a cross-sectional view of the substrate structure 100 after a layer of magnetic material 120 has been plated over the plating seed layer 118 in accordance with some embodiments. For several embodiments, the magnetic material 120 may comprise a high moment magnetic material, and may include such materials as NiFe, CoNiFe, or CoFe.

In various embodiments, the process can perform the sequence of actions in a different order, can skip one or more of the actions, or can perform additional actions. Additionally, in some embodiments, one or more of the actions may be performed simultaneously.

In several embodiments, additional layers can be included and/or actions taken as part of a Perpendicular Magnetic Recording (PMR) writer pole fabrication process. For instance, a chemical mechanical planarization (CMP) stop layer may be deposited and used as a stop to planarize the surface of a magnetic pole and thereby accurately control a height of the magnetic pole for the PMR writer pole. In some embodiments, other layers and actions for the PMR writer pole fabrication process are used.

Figure 2:
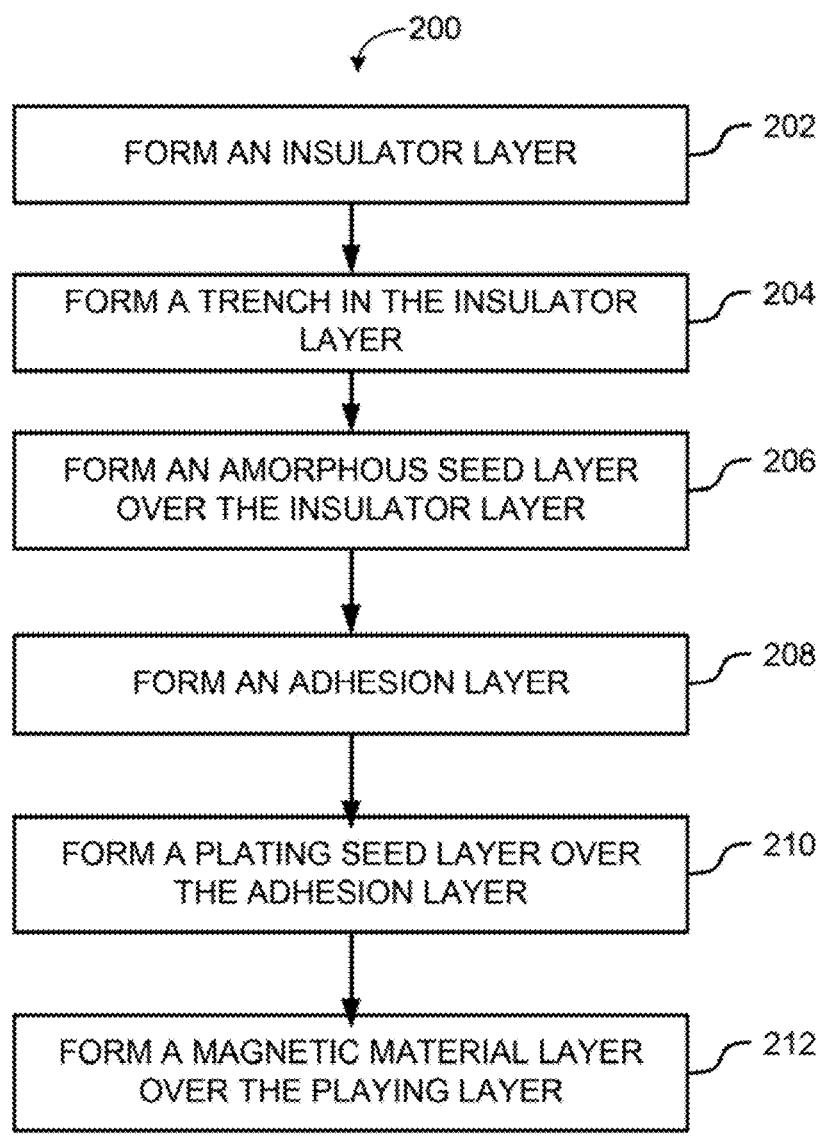
FIG. 2 is flowchart illustrating an exemplary method for forming substrate structures in accordance with some embodiments.

FIG. 2 is flowchart illustrating an exemplary method 200 for forming substrate structures in accordance with some embodiments. Various embodiments includes deposition of an amorphous seed layer for providing a substantially uniform and conformal Ru plating seed layer, and deposition of an adhesion layer over the amorphous seed layer to promote adhesion between the amorphous seed layer and one or more layers deposited over the adhesion layer (e.g., a plating seed layer).

At step 202, an insulator layer is formed, possibly over a lower substrate or base layer. In some embodiments, the insulator layer may be deposited over an etch stop layer, such as a chromium (Cr) stop layer. Subsequently, at step 204, a portion of the insulator layer is removed to form a trench. For certain embodiments, the insulator removal and formation of the trench may use an etching process, such as a reactive ion etching process or other suitable process.

At step 206, an amorphous seed layer is formed, possibly over the insulator layer formed at step 202, where the amorphous seed layer includes a metal oxide or a metal nitride. According to some embodiments, the amorphous seed layer 114 may include any of the valve metals, such as Al, Ti, Tu, Ta, W, Ta, Hf, Nb, Zr or Si. Additionally, for some embodiments, the amorphous seed layer 114 may comprise $TaO_x$, $TiO_x$, $AlO_x$, $SiO_x$, or $WO_x$. In some embodiments, the amorphous seed layer may be deposited using a physical vapor deposition (PVD), a chemical vapor deposition (CVD), or an atomic layer deposition (ALD) process. In several embodiments, intervening sub-processes may be performed on the insulator layer prior to deposition of the amorphous seed layer as described above.

At step 208, an adhesion layer is formed, possibly over the amorphous seed layer formed at step 206. The adhesion layer may comprise a noble metal, such as Ru, Rh, Pd, Ag, Os, Ir, Pt, or Au. The adhesion layer may be deposited using a physical vapor deposition (PVD). Inserting a physical vapor deposited (PVD) noble metal adhesion layer, such as a PVD Ru-film adhesion layer, between a CVD Ru-layer and an amorphous seed layer may achieve favorable adhesion between the CVD Ru-layer and the amorphous seed layer (i.e., reduce the chances of CVD Ru delamination) and excellent film properties on amorphous the seed layers.

At step 210, a plating seed layer is formed, possibly over the adhesion layer formed at step 208. The plating seed layer may include Ru on the amorphous seed layer, such chemical vapor deposition (CVD) Ru. For various embodiments, the plating seed layer may be deposited using a chemical vapor deposition process. In some embodiments, other suitable deposition techniques, such as atomic layer deposition (ALD), can be used to form the plating seed layer.

At step 212, a magnetic material layer is formed, possibly over the plating seed layer at step 210. In several embodiments, the magnetic material may comprise a high moment magnetic material, and may include such materials as NiFe, CoNiFe, or CoFe.

In various embodiments, the process can perform the sequence of actions in a different order, can skip one or more of the actions, or can perform additional actions. Additionally, in some embodiments, one or more of the actions may be performed simultaneously.

Figure 3:
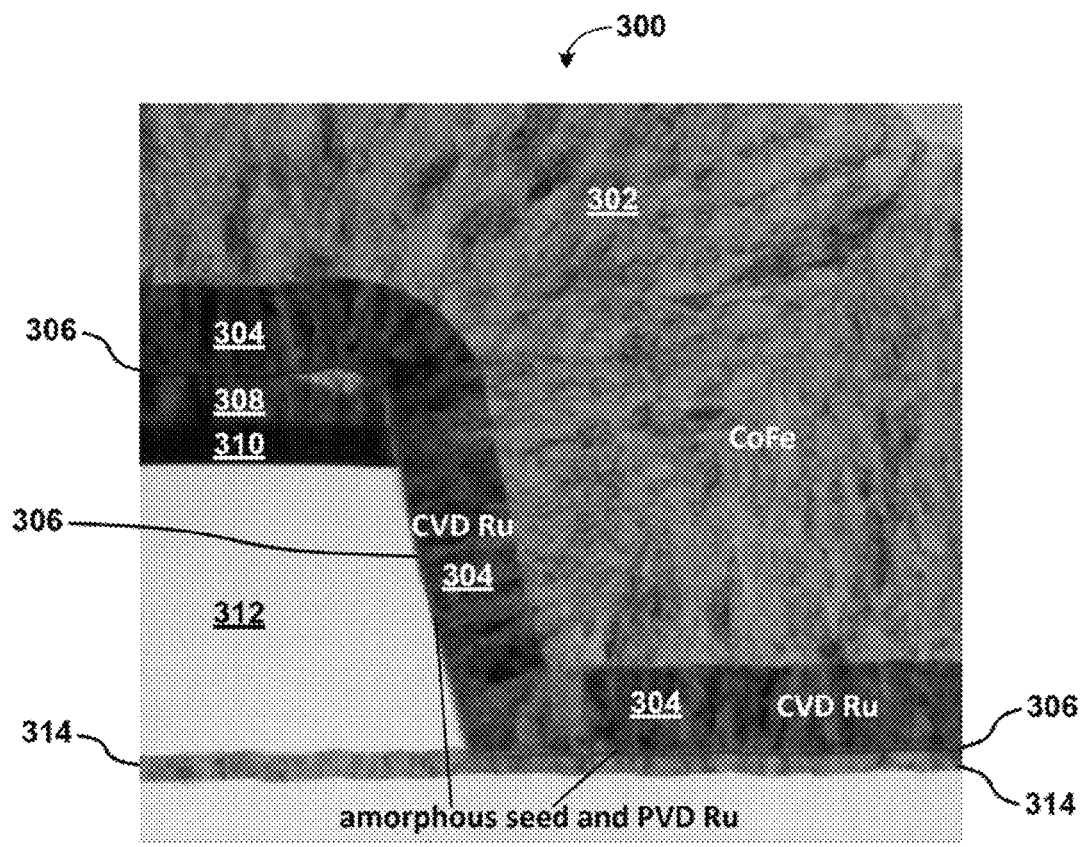
FIG. 3 is a transmission electron microscopy (TEM) image of a an exemplary substrate structure in accordance with some embodiments.

FIG. 3 is a transmission electron microscope (TEM) image of a an exemplary substrate structure in accordance with some embodiments. The TEM image depicts a film stack 300, comprising a CoFe layer 302, a chemical vapor deposition (CVD) Ru layer 304, a physical vapor deposited (PVD) Ru adhesion layer 306, and an amorphous seed layer 308. The film stack further comprises a mask layer 310, an insulator substrate 312, and a lower substrate or base layer 314. As depicted, the chemical vapor deposition (CVD) Ru layer 304 has smooth surface and uniform thickness at all locations and is free of delamination. Additionally, there is no presence of delamination between the CVD Ru layer 304, the PVD Ru adhesion layer 306, and the amorphous seed layer 308.

Figure 4:
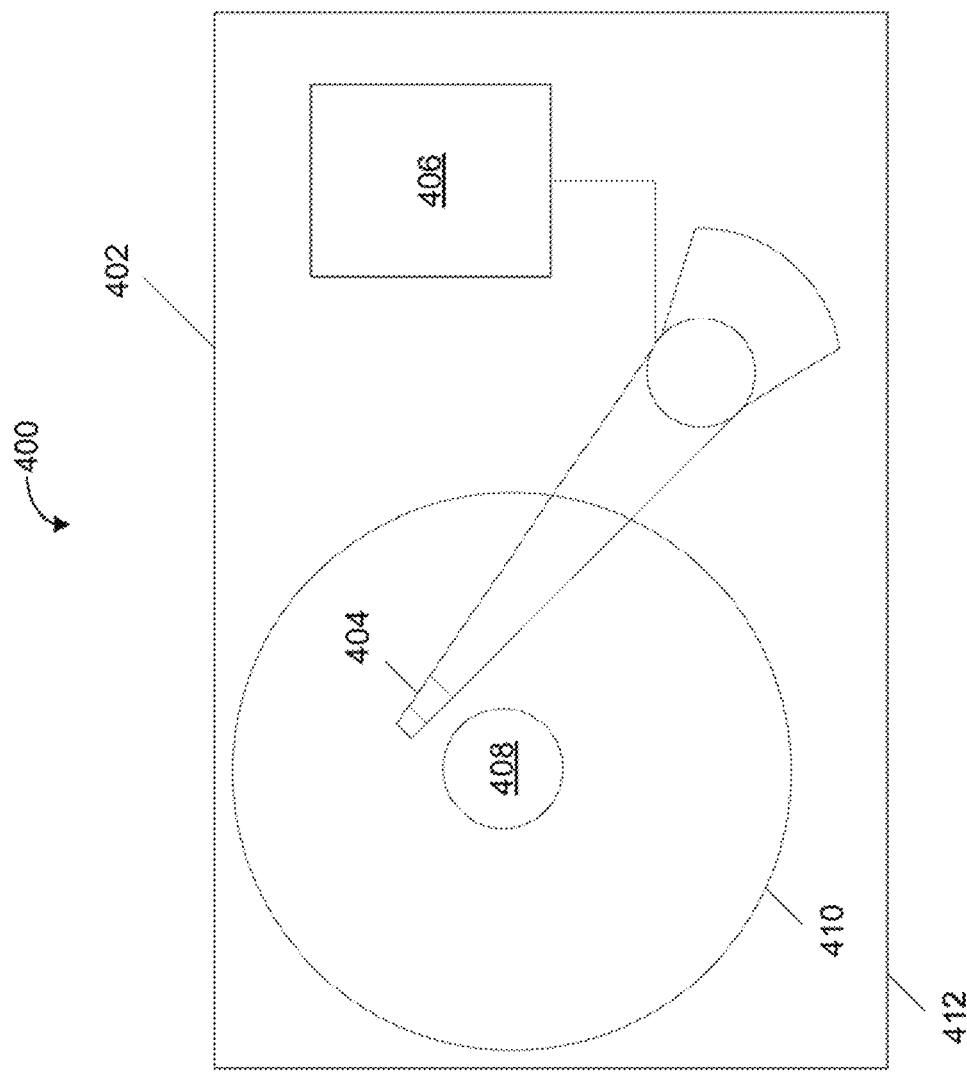
FIG. 4 is a diagram illustrating an exemplary disk drive including a read-write head formed in accordance with some embodiments.

FIG. 4 is a diagram illustrating an exemplary disk drive 400 including a read-write the head 404 that can be created in accordance with some embodiments. Disk drive 400 may include one or more disks to store data. The disks 410 reside on a spindle assembly 408 that is mounted to drive housing 412. Data may be stored along tracks in the magnetic recording layer of one of the disks 410. The reading and writing of data is accomplished with the head 404 that has both read and write elements. The write element is used to alter the properties of the perpendicular magnetic recording layer of disk 410. In some embodiments, the head 404 may have one of the structures depicted in FIG. 1G. Additionally, for some embodiments, the head 404 may have magneto-resistive (MR) or giant magneto-resistive (GMR) elements. In further embodiments, the head 404 may be another type of head, for example, an inductive read/write head or a Hall effect head. In various embodiments, the disk drive 400 may a perpendicular magnetic recording (PMR) drive, and the head 404 may be suitable for perpendicular magnetic recording (PMR). A spindle motor (not shown) rotates the spindle assembly 408 and, thereby, disks 410 to position the head 404 at a particular location along a desired disk track. The position of the head 404 relative to the disks 410 may be controlled by position control circuitry 406.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:
1. A magnetic recording pole, comprising:
an insulator layer;
an amorphous seed layer disposed over the insulator, wherein the amorphous seed layer comprises $TaO_x$, $TiO_x$, or $WO_x$;

an adhesion layer disposed over the amorphous seed layer, the adhesion layer comprising a physical vapor deposited (PVD) noble metal;
a plating seed layer disposed over the adhesion layer, the plating seed layer comprising chemical vapor deposited (CVD) $RuO_4$; and
a magnetic material layer disposed over the plating seed layer.

2. The recording medium of claim 1, wherein the PVD noble metal comprises Ru, Rh, Pd, Ag, Os, Ir, Pt, or Au.

3. The recording medium of claim 1, wherein the insulator layer comprises alumina.

4. The recording medium of claim 1, wherein the magnetic material layer comprises NiFe or CoFe.

\* \* \* \* \*